(12) United States Patent
Liao et al.

(10) Patent No.: US 9,716,683 B2
(45) Date of Patent: Jul. 25, 2017

(54) METHOD AND APPARATUS FOR TOKEN DETERMINATION FOR PEOPLE AWARENESS AND LOCATION SHARING

(71) Applicant: Nokia Technologies Oy, Espoo (FI)

(72) Inventors: Zhuoyuan Liao, Beijing (CN); Hongrui Shen, Beijing (CN); Bing Lin, Beijing (CN); Yaochu Que, Beijing (CN); Naichen Cui, Beijing (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/917,684

(22) PCT Filed: Sep. 12, 2013

(86) PCT No.: PCT/CN2013/083387
§ 371 (c)(1),
(2) Date: Mar. 9, 2016

(87) PCT Pub. No.: WO2015/035583
PCT Pub. Date: Mar. 19, 2015

(65) Prior Publication Data
US 2016/0219012 A1    Jul. 28, 2016

(51) Int. Cl.
*H04W 24/00* (2009.01)
*H04L 12/58* (2006.01)
(Continued)

(52) U.S. Cl.
CPC ........ *H04L 51/20* (2013.01); *H04M 3/42365* (2013.01); *H04M 3/56* (2013.01); *H04W 4/023* (2013.01); *H04M 2242/30* (2013.01)

(58) Field of Classification Search
CPC ..................................... H04L 51/20
See application file for complete search history.

(56) References Cited

U.S. PATENT DOCUMENTS

| | | | | |
|---|---|---|---|---|
| 2009/0215469 A1* | 8/2009 | Fisher | ................... | H04L 12/588 455/456.3 |
| 2012/0008526 A1* | 1/2012 | Borghei | ................ | H04W 4/021 370/254 |
| 2015/0195235 A1* | 7/2015 | Trussel | ................... | H04L 51/20 455/413 |

FOREIGN PATENT DOCUMENTS

| | | |
|---|---|---|
| CN | 1710923 A | 12/2005 |
| CN | 1740809 A | 3/2006 |
| | (Continued) | |

OTHER PUBLICATIONS

International Search Report and Written Opinion received for corresponding Patent Cooperation Treaty Application No. PCT/CN2013/083387, dated Jun. 11, 2014, 13 pages.

(Continued)

*Primary Examiner* — Justin Lee
(74) *Attorney, Agent, or Firm* — Ditthavong & Steiner, P.C.

(57) ABSTRACT

An example approach is provided for causing, at least in part, a generation of token data associated with at least one scheduled meeting between at least one first user and at least one second user. The approach also involves causing, at least in part, a transmission of the token data to at least one first device associated with the at least one first user and at least one second device associated with the at least one second user. The approach further involves causing, at least in part, a sharing of location information between the at least one first device and the at least one second device based, at least in part, on the token data.

20 Claims, 16 Drawing Sheets

(51) Int. Cl.
*H04M 3/42* (2006.01)
*H04M 3/56* (2006.01)
*H04W 4/02* (2009.01)

(56) References Cited

FOREIGN PATENT DOCUMENTS

| CN | 103163538 A | 6/2013 |
|---|---|---|
| EP | 2 523 476 A1 | 11/2012 |

OTHER PUBLICATIONS

Office Action for corresponding European Patent Application No. 13893479.9-1853, dated Mar. 30, 2017, 7 pages.

\* cited by examiner

METHOD AND APPARATUS FOR TOKEN DETERMINATION FOR PEOPLE AWARENESS AND LOCATION SHARING

RELATED APPLICATION

This application was originally filed as Patent Cooperation Treaty Application No. PCT/CN2013/083387 filed Sep. 12, 2013.

BACKGROUND

Service providers and device manufacturers (e.g., wireless, cellular, etc.) are continually challenged to deliver value and convenience to consumers by, for example, providing compelling network services. Although mobile devices allow users to exchange information from anywhere, in particular when users are geographically separated they may need a service that aids them in coordinating their meeting arrangements by sharing location information, temporal information etc. One area of focus has been the development of services and applications to facilitate one or more users in locating each other in a crowded environment by using token as a means of identification for temporary people awareness and location sharing purposes. Therefore, service providers and device manufacturers are facing significant technical challenges in providing token as a means of assistance for users to trace one another in a congested surrounding.

SOME EXAMPLE EMBODIMENTS

Therefore, there is a need for an approach for causing, at least in part, a generation and/or transmission of token data between at least one first device and at least one second device associated with at least one scheduled meeting, wherein location information may be shared based, at least in part, on the token data between the at least one first device and the at least one second device.

According to one embodiment, a method comprises causing, at least in part, a generation of token data associated with at least one scheduled meeting between at least one first user and at least one second user. The method also comprises causing, at least in part, a transmission of the token data to at least one first device associated with the at least one first user and at least one second device associated with the at least one second user. The method further comprises causing, at least in part, a sharing of location information between the at least one first device and the at least one second device based, at least in part, on the token data.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a generation of token data associated with at least one scheduled meeting between at least one first user and at least one second user. The apparatus is also causes, at least in part, a transmission of the token data to at least one first device associated with the at least one first user and at least one second device associated with the at least one second user. The apparatus further causes, at least in part, a sharing of location information between the at least one first device and the at least one second device based, at least in part, on the token data.

According to another embodiment, a computer-readable storage medium carries one or more sequences of one or more instructions which, when executed by one or more processors, cause, at least in part, an apparatus to cause, at least in part, a generation of token data associated with at least one scheduled meeting between at least one first user and at least one second user. The apparatus also causes, at least in part, a transmission of the token data to at least one first device associated with the at least one first user and at least one second device associated with the at least one second user. The apparatus further causes, at least in part, a sharing of location information between the at least one first device and the at least one second device based, at least in part, on the token data.

According to another embodiment, an apparatus comprises means for causing, at least in part, a generation of token data associated with at least one scheduled meeting between at least one first user and at least one second user. The apparatus also comprises means for causing, at least in part, a transmission of the token data to at least one first device associated with the at least one first user and at least one second device associated with the at least one second user. The apparatus further comprises means for causing, at least in part, a sharing of location information between the at least one first device and the at least one second device based, at least in part, on the token data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for causing, at least in part, a generation and/or transmission of token data between at least one first device and at least one second device associated with at least one scheduled meeting, wherein location information may be shared based, at least in part, on the token data between the at least one first device and the at least one second device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
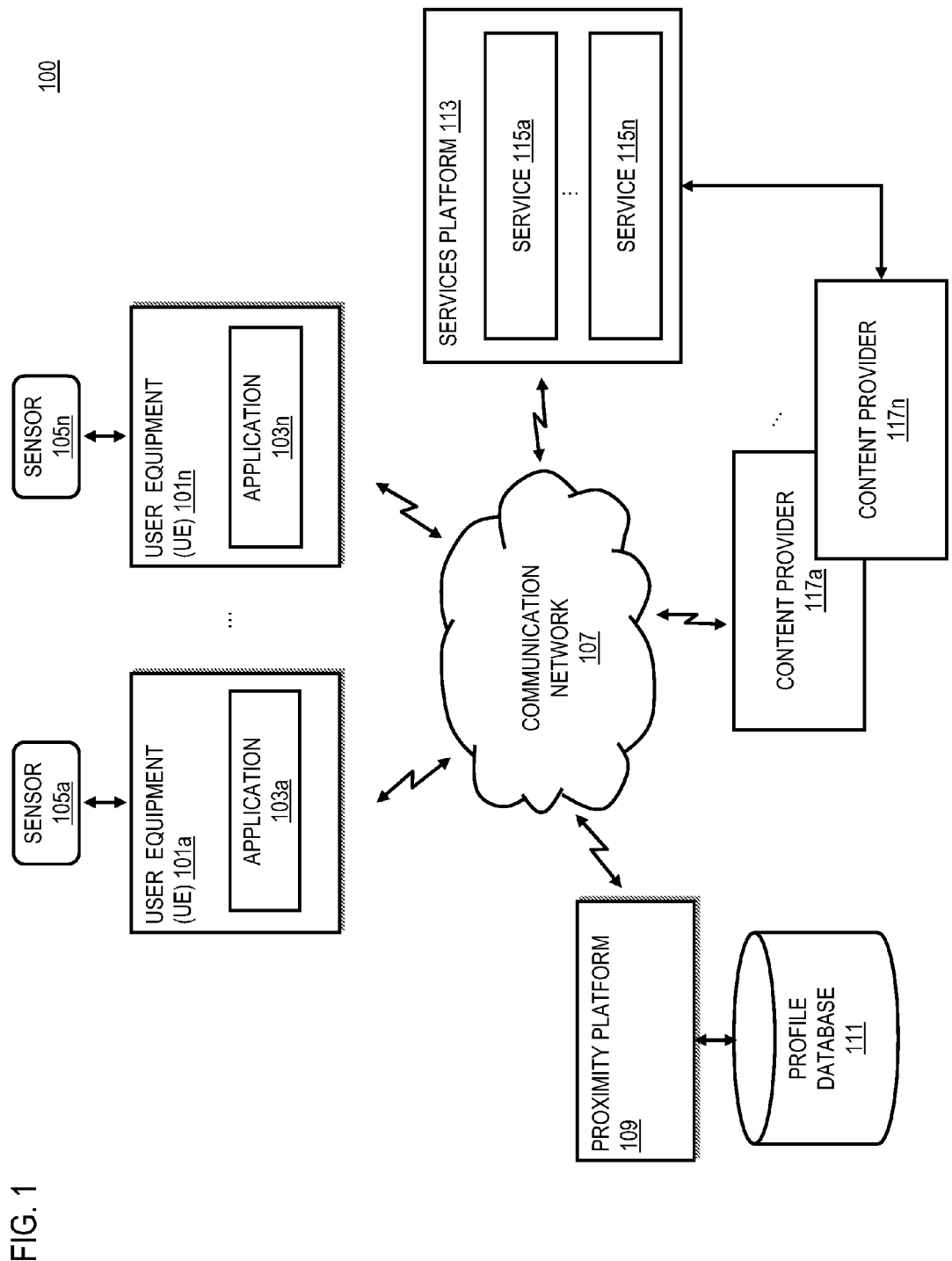
FIG. 1 is a diagram of a system capable of causing, at least in part, a generation and/or transmission of token data between at least one first device and at least one second device associated with at least one scheduled meeting, wherein location information may be shared based, at least in part, on the token data between the at least one first device and the at least one second device, according to one embodiment.

FIG. 1 is a diagram of a system capable of causing, at least in part, a generation and/or transmission of token data between at least one first device and at least one second device associated with at least one scheduled meeting, wherein location information may be shared based, at least in part, on the token data between the at least one first device and the at least one second device, according to one embodiment. In today's increasingly populated world, people find it difficult to locate each other in a crowded environment, especially for the users who have never met one another in person and have agreed to a face to face meeting, therefore there is a growing need for a method to find target person from crowd environment by means of people awareness and location sharing between the users in a network session.

To address this problem, system 100 of FIG. 1 introduces the capability to allow users to opt into a dynamically defined network by connecting UE 101 through a combination of physical proximity, temporal proximity, wireless communications, near field communication etc. The mobility of mobile communication devices not only allows users to communicate with each other at any time, but also from any location. As a result, a method of using a pre-defined token advertisement via short range means to assist users by the means of people awareness in crowded and/or unfamiliar surroundings is introduced. In one scenario, the users of two or more user devices in a network session decide to meet, whereby they select and share at least one token data. In one scenario, a meeting application, for instance, the proximity platform 109 may be running in both the user devices, wherein the proximity platform 109 may have information about the location and time of the upcoming meeting between the users of the UE 101. Subsequently, when the proximity platform 109 detects that one or more devices are within the threshold range of the meeting location and time, it advertises the pre-shared token along with message instructions to other UE 101 to do the same. When the user devices detect each other within predetermined proximity, the proximity platform 109 initiates accurate routing for the user devices to make it easier for the users to physically find each other, thereby enabling face to face meeting of users using a pre-shared token. In addition, this method can be used to prevent kids, pets or seniors from being lost in a crowd and/or find them in an emergency.

As shown in FIG. 1, the system 100 comprises user equipment (UE) 101a-101n (collectively referred to as UE 101) that may include or be associated with applications 103a-103n (collectively referred to as applications 103), and sensors 105a-105n (collectively referred to as sensors 105). In one embodiment, the UE 101 have connectivity to the proximity platform 109, the services platform 113 and the content provider 117 via the communication network 107.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that may perform various processes and/or functions at the UE 101. In one embodiment, the applications 103 may be social networking applications, navigational applications, calendar applications, content (e.g., audio, video, images, etc.) provisioning services, etc. In one embodiment, the applications 103 may generate contextual information regarding the UE 101, or information that may be processed to determine contextual information associated with the UE 101. By way of example, an application may determine location information and/or temporal information associated with the UE 101 that may be processed as contextual information. In one embodiment, one of the applications 103 at the UE 101 may act as a client for the proximity platform 109 and perform one or more functions associated with the functions of the proximity platform 109.

In addition, the sensors 105 may be any type of sensor. In certain embodiments, the sensors 105 may include, for example, a global positioning sensor for gathering location data, a position sensor or gyroscope for detecting device orientation, a network detection sensor for detecting wireless signals or network data, temporal information and the like, a camera/imaging sensor for gathering image data, an audio recorder for gathering audio data etc. This information is provided to the proximity platform 109 for processing to determine proximity information associated with one or more UE 101 in a network session.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the proximity platform 109 may be a platform with multiple interconnected components. The proximity platform 109 may include multiple servers, intelligent networking devices, computing devices, components and corresponding software for performing the function of causing, at least in part, a generation and/or transmission of token data between at least one first device and at least one second device associated with at least one scheduled meeting, wherein location information may be shared based, at least in part, on the token data between the at least one first device and the at least one second device. In one embodiment, the proximity platform 109 may provide formation of at least one network session by a first device, and granting access to the at least one second device upon determining proximity information between the first device and the at least one second device based, at least in part, on physical proximity, temporal proximity, a near field communication, a wireless network, or a combination thereof. In addition, it is noted that the proximity platform 109 may be a separate entity of the system 100, a part of the one or more services 115 of the services platform 113, or included within the UE 101 (e.g., as part of the applications 103). In one scenario, the proximity platform 109 may be accessed by UE 101 over, for instance, the communication network 107. A UE 101 may transfer data to the proximity platform 109 for receipt by the other UE 101. The proximity platform 109 may require authentication that can be set up by either UE 101. It is contemplated that the proximity platform 109, the UE 101, as well as the services platform 113 may employ any authentication mechanism (e.g., username/password, network address filtering, biometric security, etc.) to ensure that only authorized users are able to access the services of the system 100. A location of the UE 101 and the authentication information can be communicated to the other UE 101 by a NFC link, another wireless link.

In one embodiment, a network session may be established between one or more UE 101 to schedule a meeting, whereby the proximity platform 109 may cause a generation of token data associated with at least one scheduled meeting. The proximity platform 109 may cause a selection of at least one token by the first device and the at least one second device based, at least in part, on the location information, temporal information, etc. In one embodiment, the proximity platform 109 may cause a transmission of the token data to at least one first device associated with the at least one first user and at least one second device associated with the at least one second user. In one scenario, such transmission of the token data may be based, at least in part, on a determination that the first device and the at least one second device is within a predetermined threshold. In one embodiment, the proximity platform 109 may cause sharing of location information between the at least one first device and the at least one second device based, at least in part, on the token data.

In one embodiment, the proximity platform 109 may cause, at least in part, a detection of at least one token between the first device and the at least one second device associated with at least one scheduled meeting. In one embodiment, the proximity platform 109 may cause, at least in part, a matching of the at least one token based, at least in part, on the detection. In one embodiment, the proximity platform 109 may cause, at least in part, an exchange of at least one token between the first device and the at least one second device associated with at least one scheduled meeting based, at least in part, on the matching. This manner of using token as a means of identification for one location sharing between users of UE 101 without personal information leaking avoids privacy concern of current location sharing services.

In one embodiment, the proximity platform 109 may include or have access to a profile database 111 to access or store any kind of data, such as token information, historical user information, location proximity information, temporal proximity information, contextual proximity information, etc. Data stored in the profile database 111 may, for instance, be provided by the UE 101, the services platform 113, one or more services 115a-115n (or services 115), or one or more content providers 117a-117n (or content providers 117). In one embodiment, the profile database 111 may include an index for token, and the proximity platform 109 may query the index based, at least in part, on a provided input, such as, from interacting with applications 103 via the UE 101.

In one embodiment, the services platform 113 may include any type of service. By way of example, the services platform 113 may include mapping services, navigation services, social networking services, content (e.g., text, images, etc.) provisioning services, application services, storage services, contextual information determination services, location based services, information (e.g., weather, news, time etc.) based services, etc. In one embodiment, the services platform 113 may interact with the UE 101, the proximity platform 109 and the content providers 117 to supplement or aid in the processing of the content information.

In one embodiment, the services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability.

The content providers 117 may provide content to the UE 101, the proximity platform 109, and the services 115 of the services platform 113. The content provided may be any type of content, such as textual content, image content, video content etc. In one embodiment, the content providers 117 may provide content that may supplement content of the applications 103, sensors 105, or a combination thereof. In one embodiment, the content providers 117 may also store content associated with the UE 101, the proximity platform 109, and the services 115 of the services platform 113. In one embodiment, the content providers 117 may manage access to a central repository of data, and offer a consistent, standard interface to data. In another embodiment, the content providers 117 act as hosts of one or more websites, social networking services, advertising materials, data feeds, or sources of other information and/or documents.

By way of example, the UE 101, the proximity platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
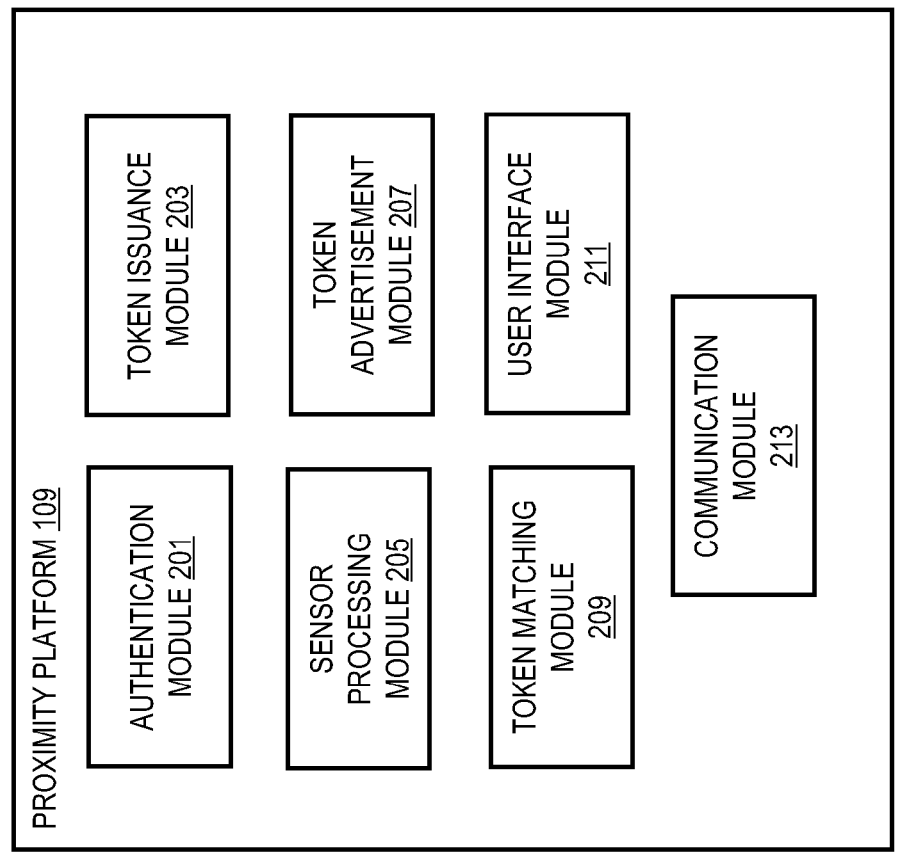
FIG. 2 is a diagram of the components of the proximity platform 109, according to one embodiment.

FIG. 2 is a diagram of the proximity platform 109 for causing, at least in part, a generation and/or transmission of token data between at least one first device and at least one second device associated with at least one scheduled meeting, wherein location information may be shared based, at least in part, on the token data between the at least one first device and the at least one second device. By way of example, the proximity platform 109 may include an authentication module 201, a token issuance module 203, a sensor processing module 205, a token advertisement module 207, a token matching module 209, and a user interface module 211. It is contemplated that the functions of these components may be combined in one or more components or performed by other components of equivalent functionality.

In one embodiment, the authentication module 201 authenticates users and UE 101 for interaction with the proximity platform 109. By way of example, the authentication module 201 receives a request to subscribe to the proximity platform 109 for enabling seamless transmission and/or detection of at least one token that represents the parties to the network session based, at least in part, on proximity information. It is noted that the authentication may include a first time subscription procedure for establishing one or more profile settings. In one embodiment, authentication may include receiving and validating a login name and/or user identification value as provided or established for a particular user during a subscription or registration process with the service provider. In one embodiment, the authentication procedure may also be performed through automated association of the profile database 111 with an IP address, a carrier detection signal of a user device, mobile directory number (MDN), subscriber identity module (SIM) (e.g., of a SIM card), radio frequency identifier (RFID) tag or other identifier. These means of authentication reduces privacy concern related to location sharing services.

In one embodiment, the token issuance module 203 may issue at least one token based on a determination that one or more UE 101 in a network session have fixed a place and time of meet. In one scenario, the users of the UE 101 in a network session may fix a location and time for meeting whereby the token issuance module may issue a token as a representation for this event. Under this scenario, when required information is provided by the parties to the network session a token may be created, the token may be automatically saved and/or transferred to the respective participants in the network session for usage.

In one embodiment, the sensor processing module 205 may process sensor information received from sensors 105, and subsequently coordinate with the token advertisement module to initiate the transmission of the at least one token because the participant to the network session satisfies the predetermined threshold specified in the calendar information. In one scenario, the calendar information may be but is not limited to, location information, temporal information, and so on.

In one embodiment, the token advertisement module 207 and token matching module 209 interacts with UE 101 to enable transmission and/or detection and/or retrieval and subsequent storing of at least one token. By way of example, the token advertisement module 207 initiates transmission of at least one token based, at least in part, on the sensor information received from the sensor processing module 205. Under this scenario, the token advertisement module 207 may initiate a command for prompting the other UE 101 in the network session to initiate transmission of a token for verification purposes. The command may be rendered to a user interface of the other UE 101 by way of a user interface module 211. The token advertisement module 207 may then detect acceptance of the command provided to the other UE 101 when the other UE 101 causes a transmission of at least one token. In one embodiment, the token advertisement module 207 operates in connection with the communication network 107 to facilitate transmission of the token between respective UE 101 in the network session. The transmission occurs based on the information acquired by the token issuance module 203 regarding the users and/or UE associated with the issued token. In one embodiment, the advertisement module may cause transmission of at least one token at regular interval until and unless the token from other UE 101 is detected.

In one embodiment, the token matching module 209 links the token, once accepted, to the respective users of UE 101 to which the token is to be shared. By way of example, the token matching module 209 determines a location and/or a time and/or an identifier, or other information for indicating which UE 101 is to receive the token. In one scenario, participants to a network session may fix a location and time for a meeting, whereby the proximity platform 109 may assign a token for this event, the token matching module 209 identifies these pertinent associative information for the participants. In one embodiment, the token matching module 209 may store these information in the profile database 111, thus maintaining data for indicating the association between the first UE 101 and the second UE 101.

In one embodiment, the user interface module 211 may include various methods of communication. For example, the user interface module 211 may include outputs including a visual component (e.g., a screen), an audio component (e.g., amplifiers and speakers), a physical component (e.g., vibrations), and other methods of communication. In one embodiment, a user inputs may include a touch-screen interface, a scroll-and-click interface, a button interface, a microphone, etc. In one scenario, the user interface module 211 may correspond to a desktop of the UE 101 wherein the users may access any associated communications that connects the users to the network session and allows the users to provide information for obtaining at least one token.

In one embodiment, a communication module 213 enables formation of a session over a communication network 107 between the proximity platform 109, the services platform 113 and the content providers 117. By way of example, the communication module 213 executes various protocols and data sharing techniques for enabling collaborative execution between a subscriber's UE 101 and the proximity platform 109 over the communication network 107.

The above presented modules and components of the proximity platform 109 can be implemented in hardware, firmware, software, or a combination thereof. Though depicted as a separate entity in FIG. 1, it is contemplated that the proximity platform 109 may be implemented for direct operation by respective UE 101. As such, the proximity platform 109 may generate direct signal inputs by way of the operating system of the UE 101 for interacting with the applications 103. In another embodiment, one or more of the modules 201-213 may be implemented for operation by respective UEs, the proximity platform 109, or combination thereof. Still further, the proximity platform 109 may be integrated for direct operation with services 115, such as in the form of a widget or applet, in accordance with an information and/or subscriber sharing arrangement. The various executions presented herein contemplate any and all arrangements and models.

Figure 3:
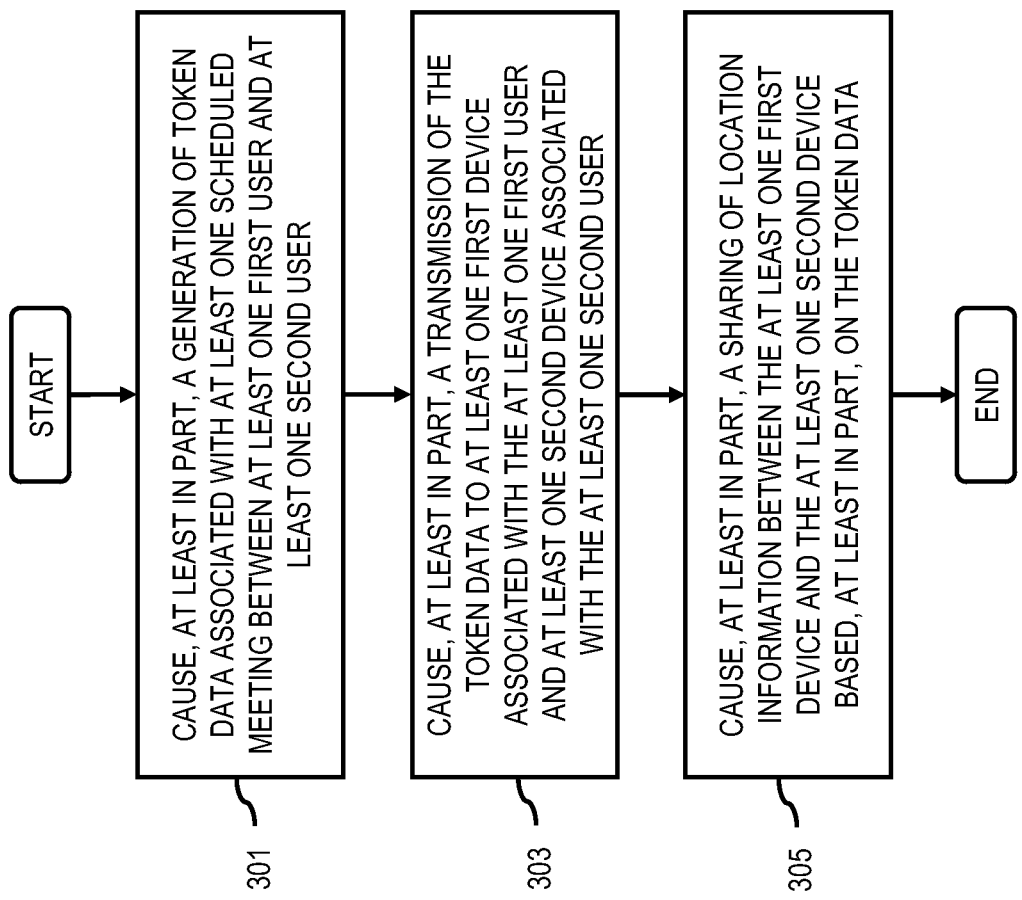
FIG. 3 is a flowchart of a process for causing, at least in part, a generation and/or transmission of token data between at least one first device and at least one second device associated with at least one scheduled meeting, wherein location information may be shared based, at least in part, on the token data between the at least one first device and the at least one second device, according to one embodiment.
Figure 15:
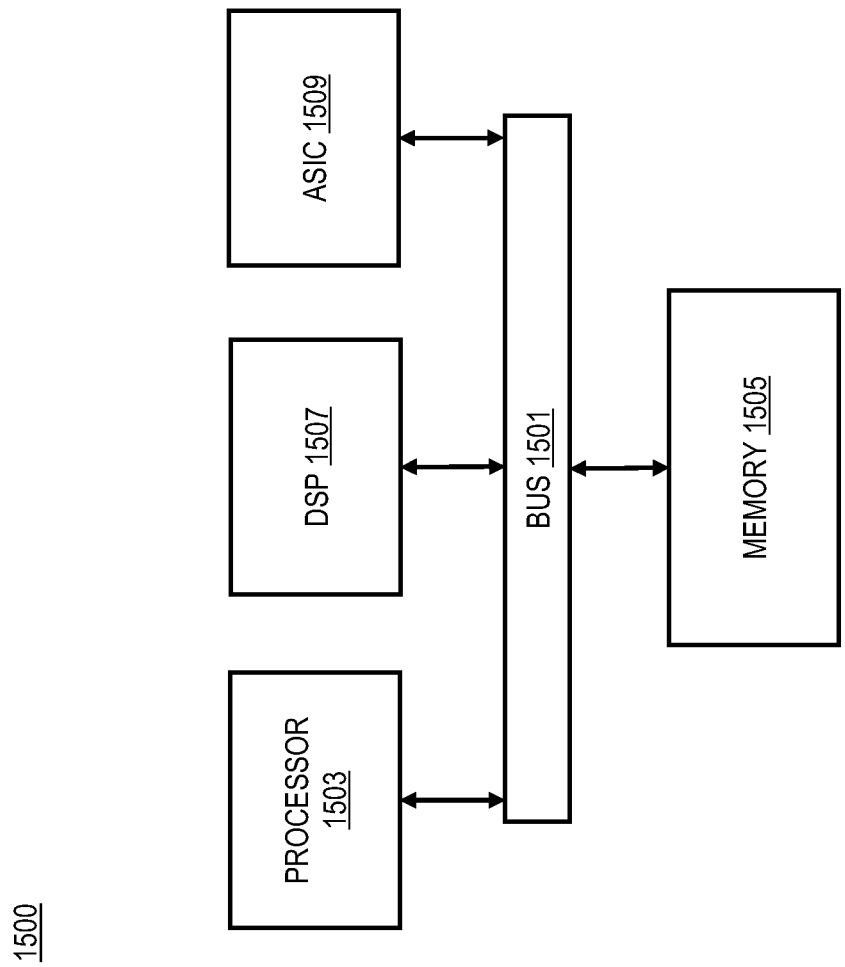
FIG. 15 is a diagram of a chip set that can be used to implement an embodiment of the invention.

FIG. 3 is a flowchart of a process for causing, at least in part, a generation and/or transmission of token data between at least one first device and at least one second device associated with at least one scheduled meeting, wherein location information may be shared based, at least in part, on the token data between the at least one first device and the at least one second device, according to one embodiment. In one embodiment, the proximity platform 109 performs the process 300 and is implemented in, for instance, a chip set including a processor and a memory as shown in FIG. 15.

In step 301, the proximity platform 109 causes, at least in part, a generation of token data associated with at least one scheduled meeting between at least one first user and at least one second user. In one embodiment, the token data is anonymized with respect to the least one first user, the at least one first device, the at least one second user, the at least one second device, the at least one scheduled meeting, or a combination thereof. In one scenario, one or more user devices may establish at least one network session for scheduling a meeting, the proximity platform 109 may be running in the user devices associated with the network session whereby the proximity platform 109 may cause a selection of at least one token by the first device and the at least one second device based, at least in part, on the calendar information. In one scenario, the user devices associated with the at least one scheduled meeting may incorporate key exchange (at the time the token was selected and shared) to make the token method more reliable.

In one scenario, using the key and data signed packets (with varying contents) by the user devices associated with the at least one scheduled meeting may ensure that token is not being impersonated. Further, this reduces the privacy concerns associated with location sharing with random users.

In step 303, the proximity platform 109 causes, at least in part, a transmission of the token data to at least one first device associated with the at least one first user and at least one second device associated with the at least one second user. In one scenario, at least one token is a representation of the first device, the at least one second device, or a combination thereof, whereby the proximity platform 109 causes a transmission of at least one token based, at least in part, on a determination that the first device and the at least one second device is within a predetermined location and/or temporal parameter.

In step 305, the proximity platform 109 causes, at least in part, a sharing of location information between the at least one first device and the at least one second device based, at least in part, on the token data. In one embodiment, the sharing of the location information is via a peer-to-peer exchange over a short-range wireless connection, a location sharing service, or a combination thereof. In one scenario, the at least one token determined by the proximity platform 109 may represent the calendar information which may comprise of location information for the scheduled meeting, date information for the scheduled meeting, time information for the scheduled meeting, purpose of the scheduled meeting etc. In one scenario, the calendar information may be provided by one or more user devices associated with the scheduled meeting and may be shared with the other user devices associated with the scheduled meeting.

Figure 4:
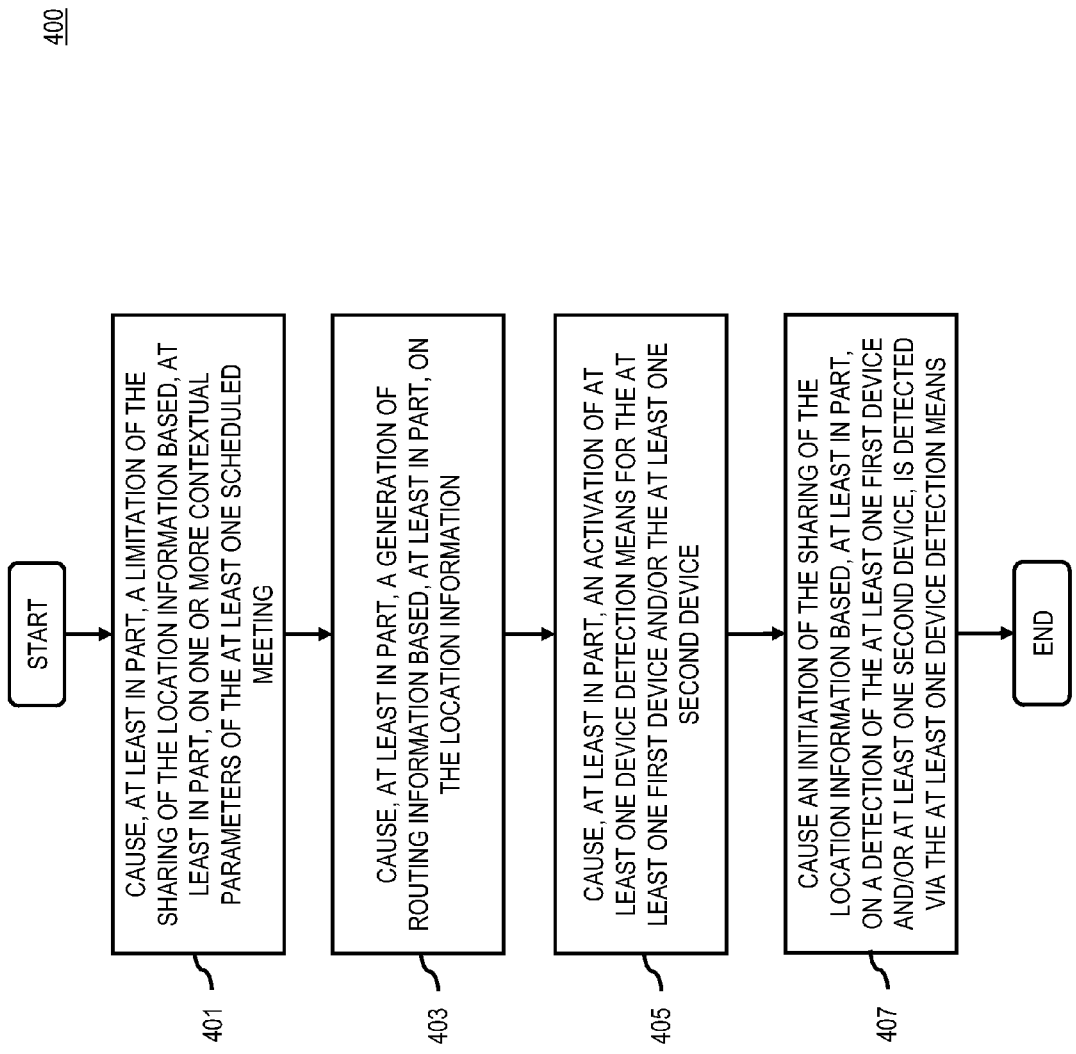
FIG. 4 is a flowchart of a process for causing an initiation of sharing of the location information based on the detection of the devices associated the at least one scheduled meeting, with a limitation of the sharing of the location information based on one or more contextual parameters of the at least one scheduled meeting, according to one embodiment.

FIG. 4 is a flowchart of a process for causing an initiation of sharing of the location information based on the detection of the devices associated the at least one scheduled meeting, with a limitation of the sharing of the location information based on one or more contextual parameters of the at least one scheduled meeting, according to one embodiment. In one embodiment, the proximity platform 109 performs the process 400 and is implemented in, for instance, a chip set including a processor and a memory as shown in FIG. 15.

In step 401, the proximity platform 109 causes, at least in part, a limitation of the sharing of the location information based, at least in part, on one or more contextual parameters of the at least one scheduled meeting. In one scenario, the proximity platform 109 upon determination that the at least one user device associated with the scheduled meeting is within the contextual parameters, for instance, location and/or time and/or date associated with the scheduled meeting, may share the location information. In one scenario, user A and user B schedules a meeting at ABC location on $6^{th}$ of Aug. 2013 at 3 p.m. via the proximity platform 109, subsequently the proximity platform 109 may share location information of user A with user B or vice versa, if the proximity platform 109 is of determination that both the users are within the location threshold.

In step 403, the proximity platform 109 causes, at least in part, a generation of routing information based, at least in part, on the location information, wherein the routing information provides guidance for locating the at least one first device, the at least one second device, or a combination thereof. In one embodiment, the proximity platform 109 causes a presentation of one or more guides on the at least one user device associated with the scheduled meeting for locating the at least one other user device associated with the scheduled meeting. In one embodiment, the one or more guides may indicate, at least in part, a direction, a pace, or a combination thereof based, at least in part, on the calendar information.

In step 405, the proximity platform 109 causes, at least in part, an activation of at least one device detection means for the at least one first device, the at least one second device, or a combination thereof. In one embodiment, the activation of the at least one device detection means is based, at least in part, on a location proximity threshold value, a temporal proximity threshold value, or a combination thereof of the at least one first device, the at least one second device, or a combination thereof to at least one location, at least one time, at least one date, or a combination thereof associated with the at least one scheduled meeting.

In step 407, the proximity platform 109 causes, at least in part, an initiation of the sharing of the location information based, at least in part, on a detection of the at least one first device, the at least one second device, or a combination thereof is detected via the at least one device detection means. In one scenario, the proximity platform 109 may detect location information for the first device and the at least one second device associated with the scheduled meeting via one or more sensors, a near field communication (NFC), a wireless network, or a combination thereof.

Figure 5:
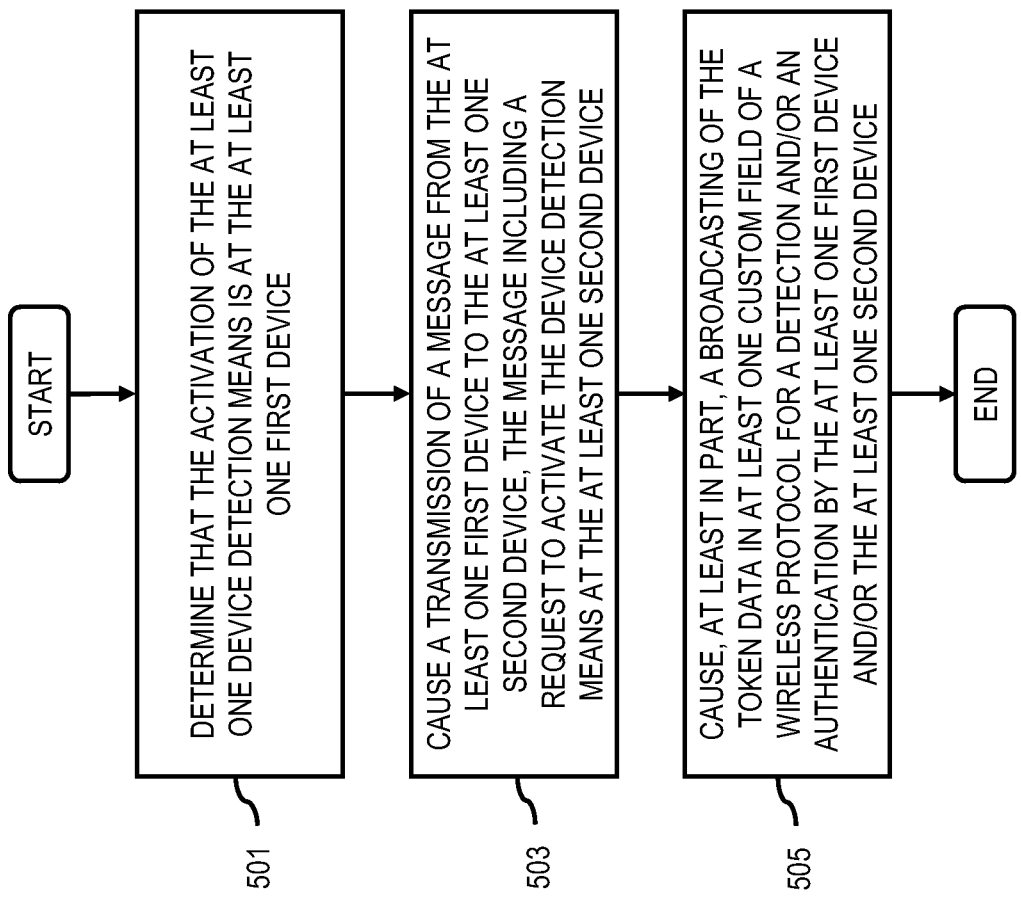
FIG. 5 is a flowchart of a process for determining an activation of the device detection means in the first device and causing a transmission of at least one message instructing the second device to activate the device detection means for causing, at least in part, a broadcasting of the token data, according to one embodiment.

FIG. 5 is a flowchart of a process for determining an activation of the device detection means in the first device and causing a transmission of at least one message instructing the second device to activate the device detection means for causing, at least in part, a broadcasting of the token data, according to one embodiment. In one embodiment, the proximity platform 109 performs the process 500 and is implemented in, for instance, a chip set including a processor and a memory as shown in FIG. 15.

In step 501, the proximity platform 109 determines that the activation of the at least one device detection means is at the at least one first device. In one scenario, the proximity platform 109 in the first device may initiate detection of other devices associated with the at least one scheduled meeting based, at least in part, on the calendar information.

In step 503, the proximity platform 109 causes, at least in part, a transmission of at least one message from the at least one first device to the at least one second device, the at least one message including a request to activate the device detection means at the at least one second device. In one scenario, user A and user B schedules a meeting at XYZ location on $11^{th}$ of Jun. 2013 at 7 p.m. via the proximity platform 109, subsequently the proximity platform 109 of user A's UE 101 may detect user B's UE 101, whereupon the proximity platform 109 of user A's UE 101 may send a message instruction to user B's UE 101 to activate the device detection for token broadcasting and/or transmission purposes.

In step 505, the proximity platform 109 causes, at least in part, a broadcasting of the token data in at least one custom field of a wireless protocol for a detection and/or an authentication by the at least one first device, the at least one second device, or a combination thereof. In one embodiment, the wireless protocol includes, at least in part, WiFi, Bluetooth, or a combination thereof. In one scenario, the proximity platform 109 of the at least one first device may detect at least one token data from the at least one second device, whereby the proximity platform may cause a matching of the token data. Subsequently, the proximity platform 109 may cause, at least in part, an exchange of token data between the first device and the at least one second device based, at least in part, on the matching.

Figure 6:
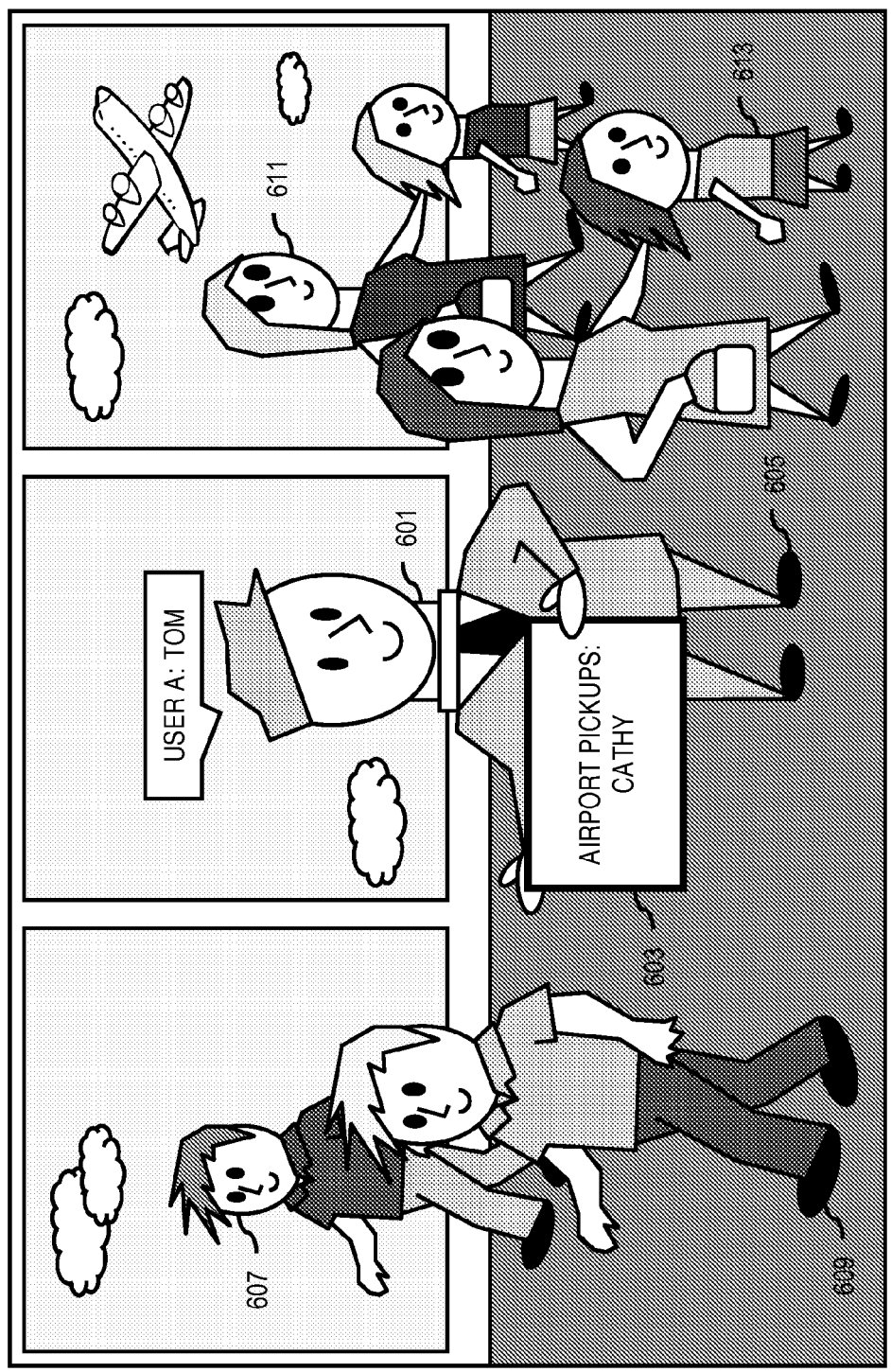
FIG. 6-13 are diagrams of user interfaces utilized in the processes of FIG. 3, according to various embodiments.

FIG. 6 is a diagram of a user interface utilized in the processes of FIGS. 3-6, according to various embodiments. FIG. 6 illustrates a scenario whereby Tom (601) is trying to locate Cathy in an Airport. Tom has never met Cathy before and the feasible option available for Tom is to hold a board with Cathy's name on it (603). Usually, it is not easy to locate each other in a crowded place, it is the more demanding to locate a stranger in a crowded place. As a result, Tom should locate himself in an area visible by all travelers (605), and should make sure that the name of the stranger that Tom is meeting is written in a legible manner (603). This method is tedious, and the probability of Tom finding Cathy is hard to decipher. In one scenario, this method of finding people may be rendered ineffective if there are multiple exits at the Airport, wherein Tom awaits Cathy at one end of the exit and Cathy leaves the Airport from another exit. In one scenario, the sign displaying Cathy's name (603) may be blocked by one or more passerby at the Airport (607, 609, 611, 613) rendering the method ineffective. Therefore, a viable alternative to address these problems is discussed herein below.

Figure 7:
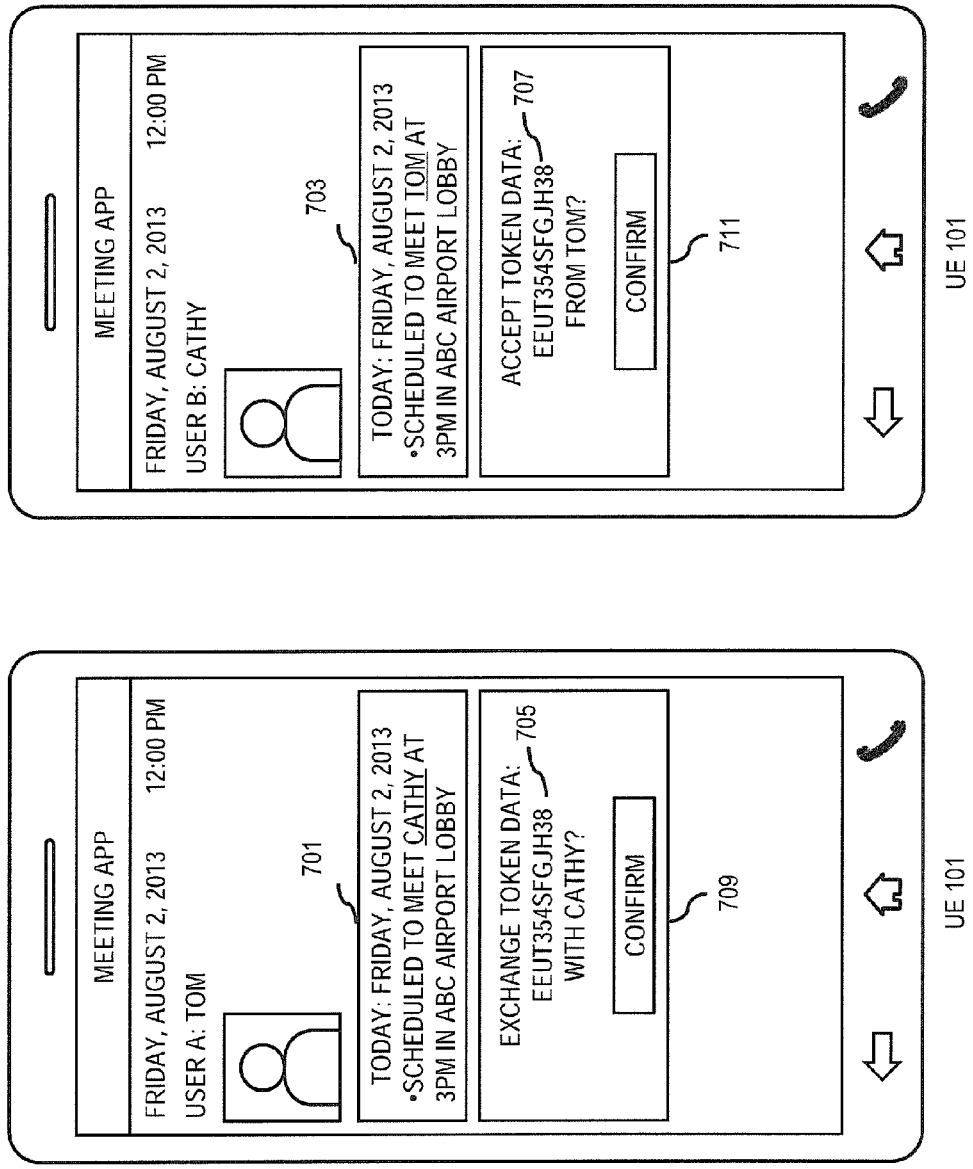

FIG. 7 is a diagram of a user interface utilized in the processes of FIGS. 3-6, according to various embodiments. FIG. 7 illustrates a scenario whereby a target person may be located in a crowd environment. In one scenario, Tom and Cathy have never met one another and they make an appointment to meet at the Airport lobby on Aug. 2, 2013 at 3:00 pm via their respective UE 101 (701, 703), whereby they define a token as the means of identification for this event (705, 707). The scheduled meeting between Tom and Cathy may be displayed in their respective UE 101 (701, 703). In one scenario, the users of the first UE 101 (Tom) may be given an option to accept and determine a token (709) which may then be transmitted to the user of the recipient device for acceptance (711).

Figure 8:
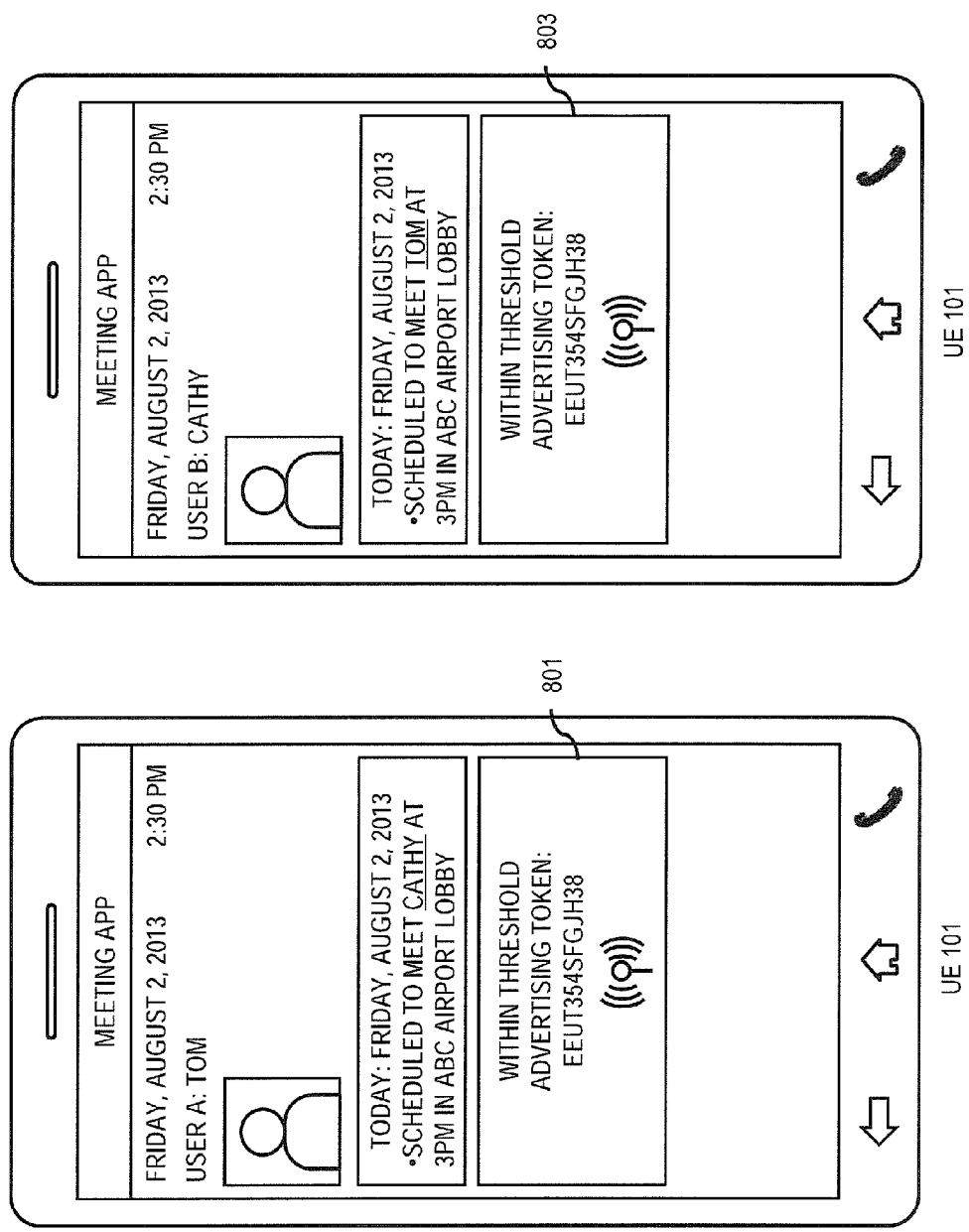

FIG. 8 is a diagram of a user interface utilized in the processes of FIGS. 3-6, according to various embodiments. FIG. 8 illustrates a scenario of advertising at least one token for locating target person in a crowd. In one scenario, if Tom travels to the Airport to meet Cathy after scheduling the meeting via UE 101 as discussed above, Tom's UE 101 will turn on the short range communication and/or wireless communication for causing a broadcasting of at least one token based, at least in part, on a determination that Tom has reached the predetermined location threshold (801, 803). Further, as soon as Tom reaches the Airport the UE 101 may send instruction to Kathy's UE 101 to cause a broadcasting of the token (801, 803).

Figure 9:
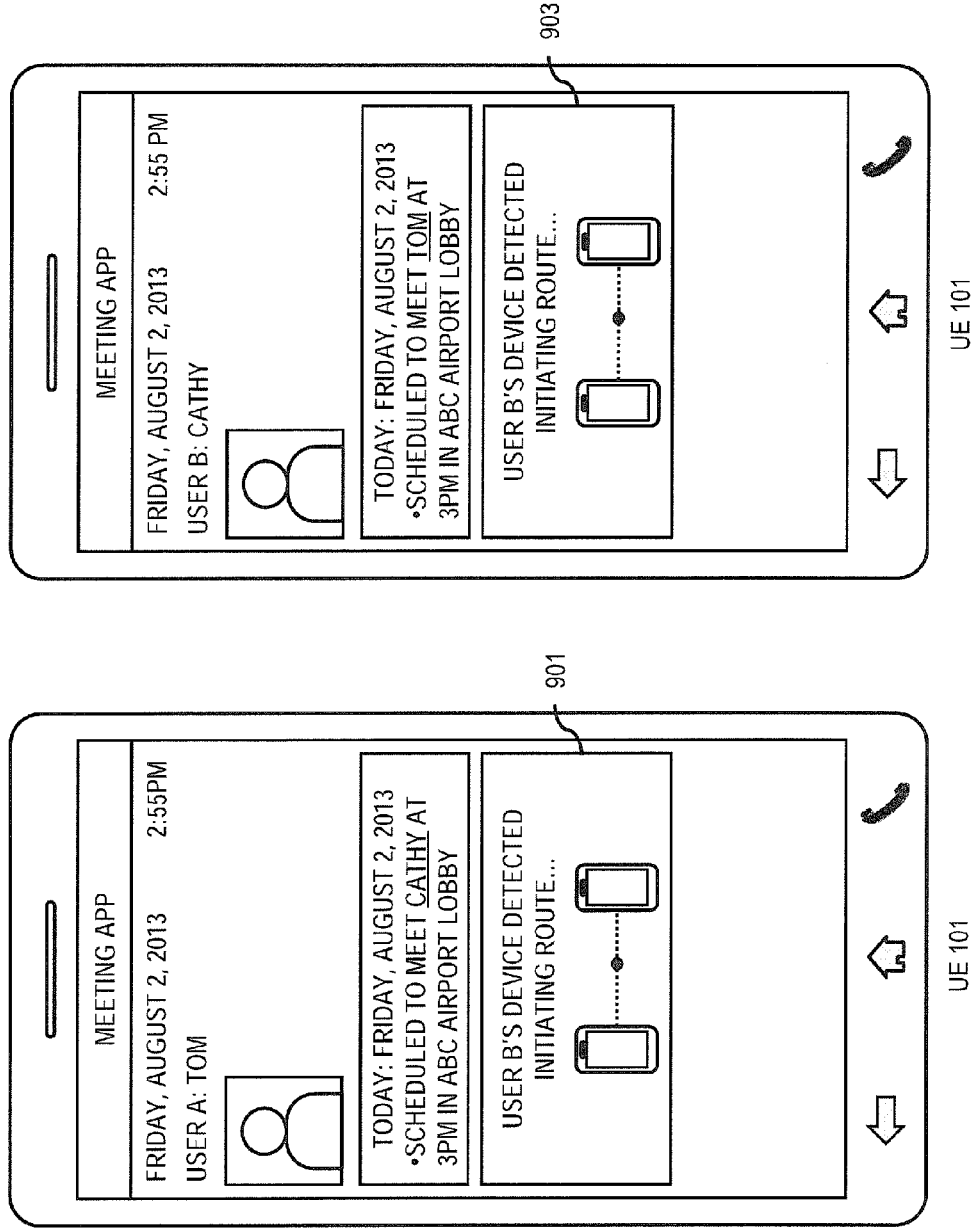

FIG. 9 is a diagram of a user interface utilized in the processes of FIGS. 3-6, according to various embodiments. FIG. 9 illustrates a scenario whereby UE 101 in a network session detects each other for location sharing and token verification. In one scenario, the UE 101 of Tom and Cathy may detect each other whereupon it may share current location information and may cause, at least in part, a matching of the at least one broadcasted token based, at least in part, on the detection (901,903). The proximity platform 109 upon determination that a predetermined threshold has been satisfied, and the token broadcasted by the UE 101 matches, may provide an accurate navigation.

Figure 10:
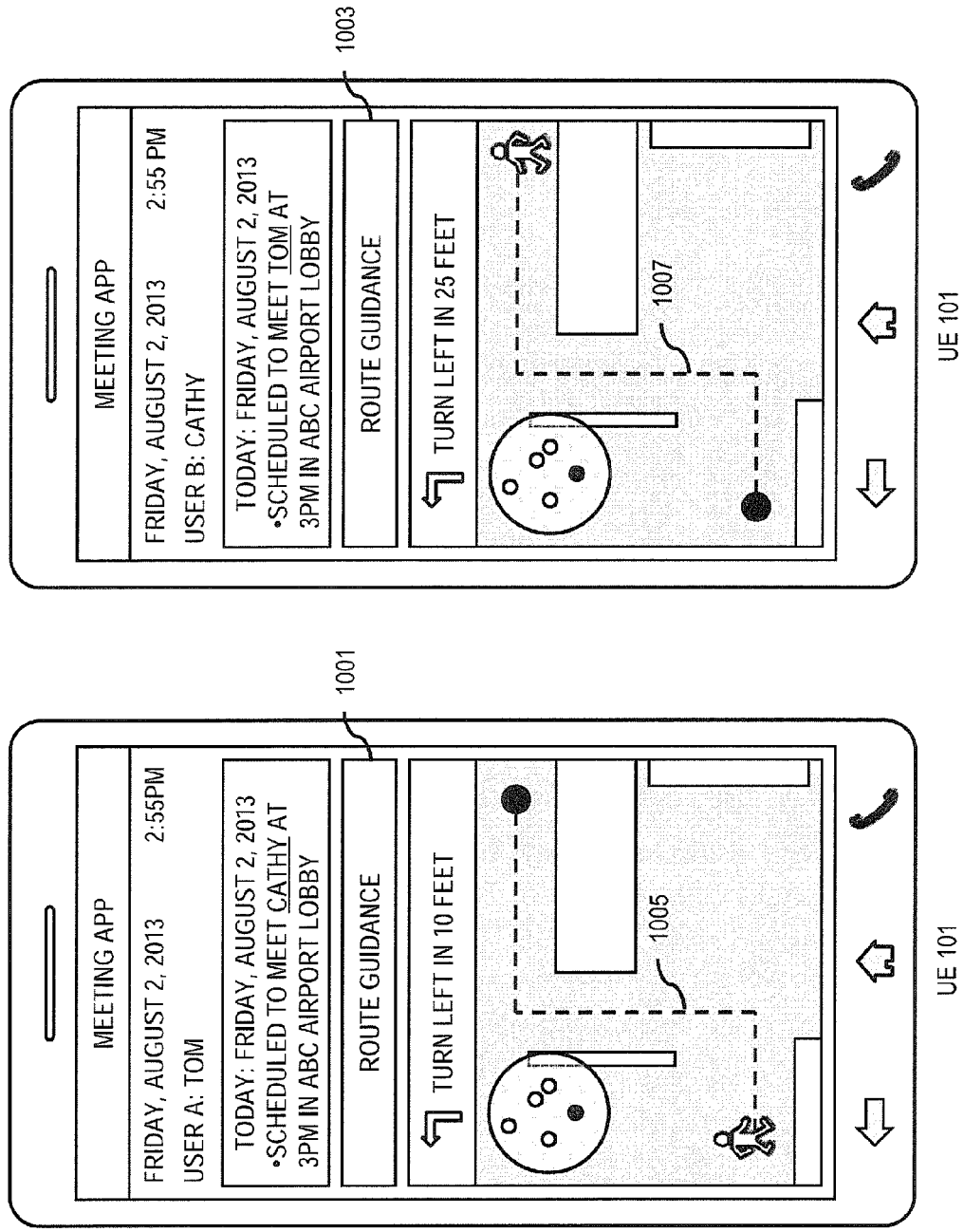

FIG. 10 is a diagram of a user interface utilized in the processes of FIGS. 3-6, according to various embodiments. FIG. 10 illustrates a scenario whereby the users in a network session are provided with guidance to locate one another in a crowded environment.

In one scenario, Tom and Cathy may exchange a token data in a manner aforementioned, upon determination that the UE 101s in a network session are within the predetermined threshold and upon verification of the token data, the proximity platform 109 may provide navigation assistance thereby making it easier for the users to locate one another (1001, 1003). In one scenario, Kathy may be guided to follow the dotted lines through the crowded environment (1005) to locate Tom, and vice-versa (1007). Further, Kathy may be provided with distance information, for instance, the number of steps she needs to walk to locate Tom. In addition, Kathy may be provided with time information, for instance, the pace that she has to maintain to locate Tom within the scheduled time.

Figure 11:
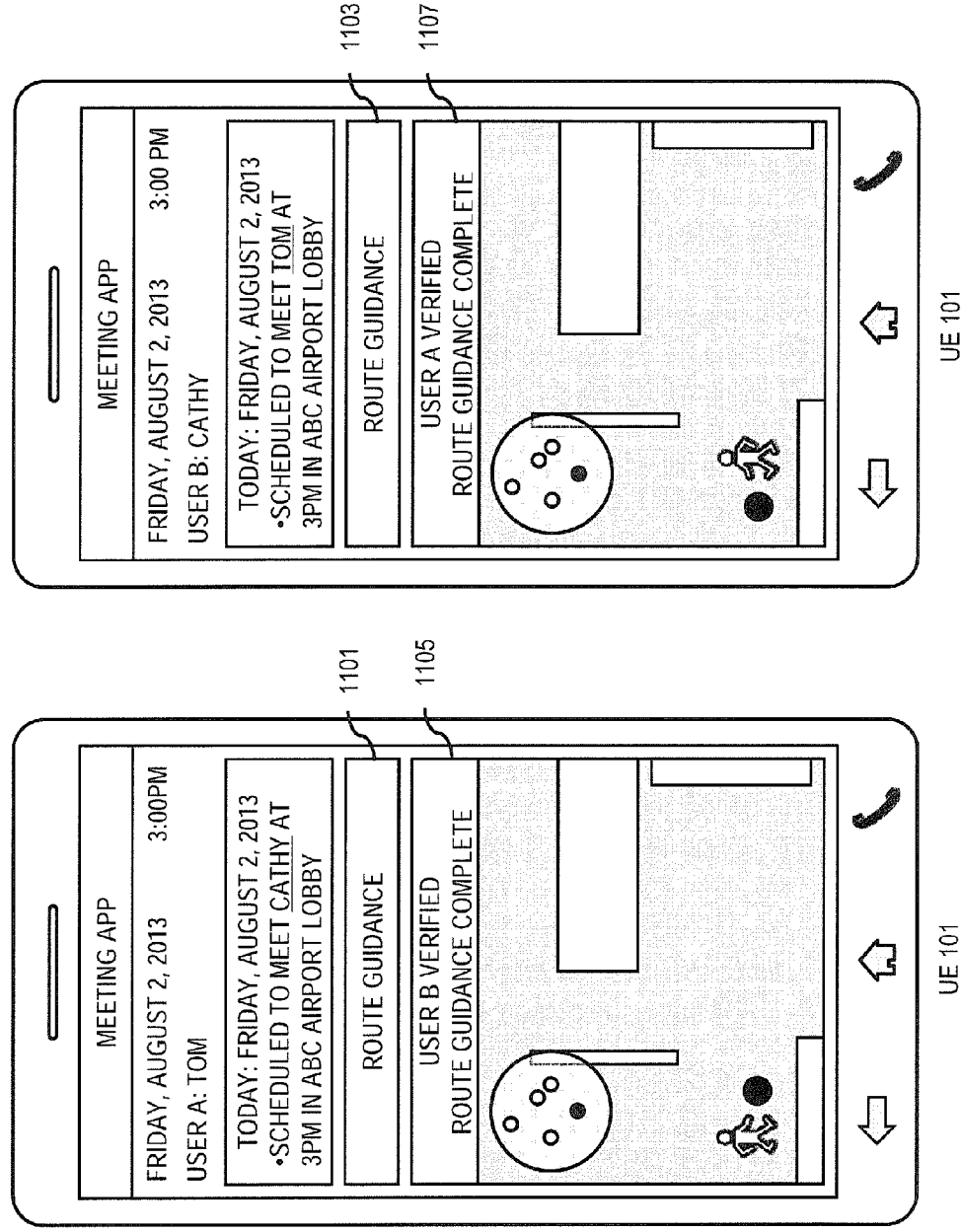

FIG. 11 is a diagram of a user interface utilized in the processes of FIGS. 3-6, according to various embodiments. FIG. 11 illustrates a scenario whereby the users of the UE 101 in a network session are informed about the proximity with other users. In one scenario, Cathy may be following the dotted line in a manner aforementioned, whereby the proximity platform 109 may inform Kathy of the distance between Tom and her (1101, 1103). In addition, the proximity platform 109 may automatically stop the routing mechanism upon determination that the parties to the network session, namely Tom and Cathy have located one another (1105, 1107).

Figure 12:
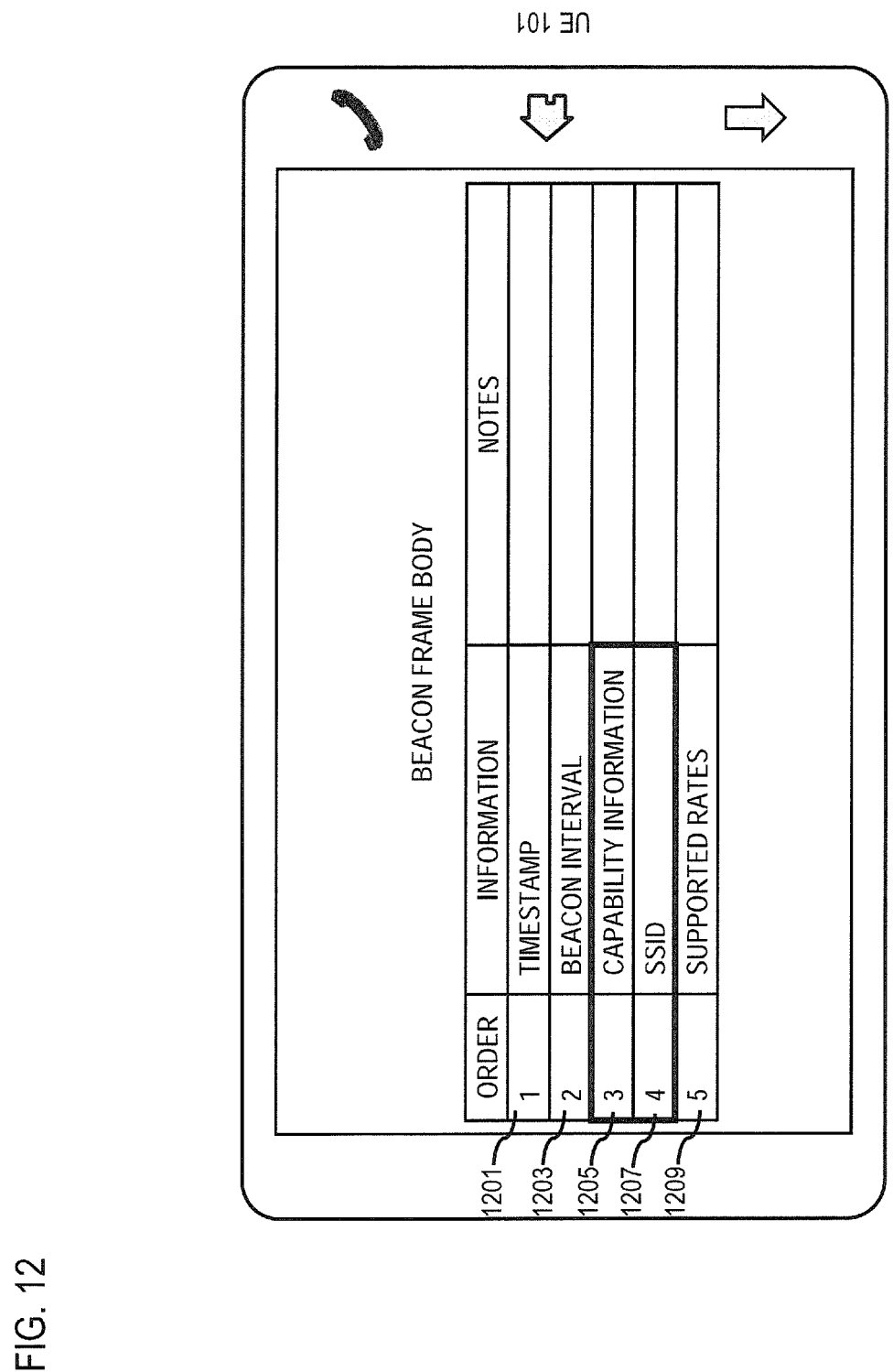

FIG. 12 is a diagram of a user interface utilized in the processes of FIGS. 3-6, according to various embodiments. In one scenario, the token may be broadcasted via near field communication such as Wi-Fi or Bluetooth, whereby the Wi-Fi and/or Bluetooth specification may define reserved fields for custom data advertisement. For example, Wi-Fi specification may define both Service Set Identifier (SSID) and capability info fields support custom data in Beacon Frame. In one embodiment, the beacon frame body for at least one token may comprise of timestamp (1201), beacon interval (1203), capability information (1205), SSID (1207) and supported rates (1209). In one embodiment, the token could be 16 universally unique identifier (UUID). In one embodiment, timestamp (1201) may be a scheduled time of meeting between the parties to a network session. In one embodiment, beacon interval 1203 may be the number of times at least one token is broadcasted and/or detected and/or matched. The capability information 1205 is discussed in detail in FIG. 13. In one embodiment, the service set identifier (SSID) 1207 may uniquely identify any given wireless network. In one embodiment, supported rates 1209 may be the supporting custom data.

Figure 13:
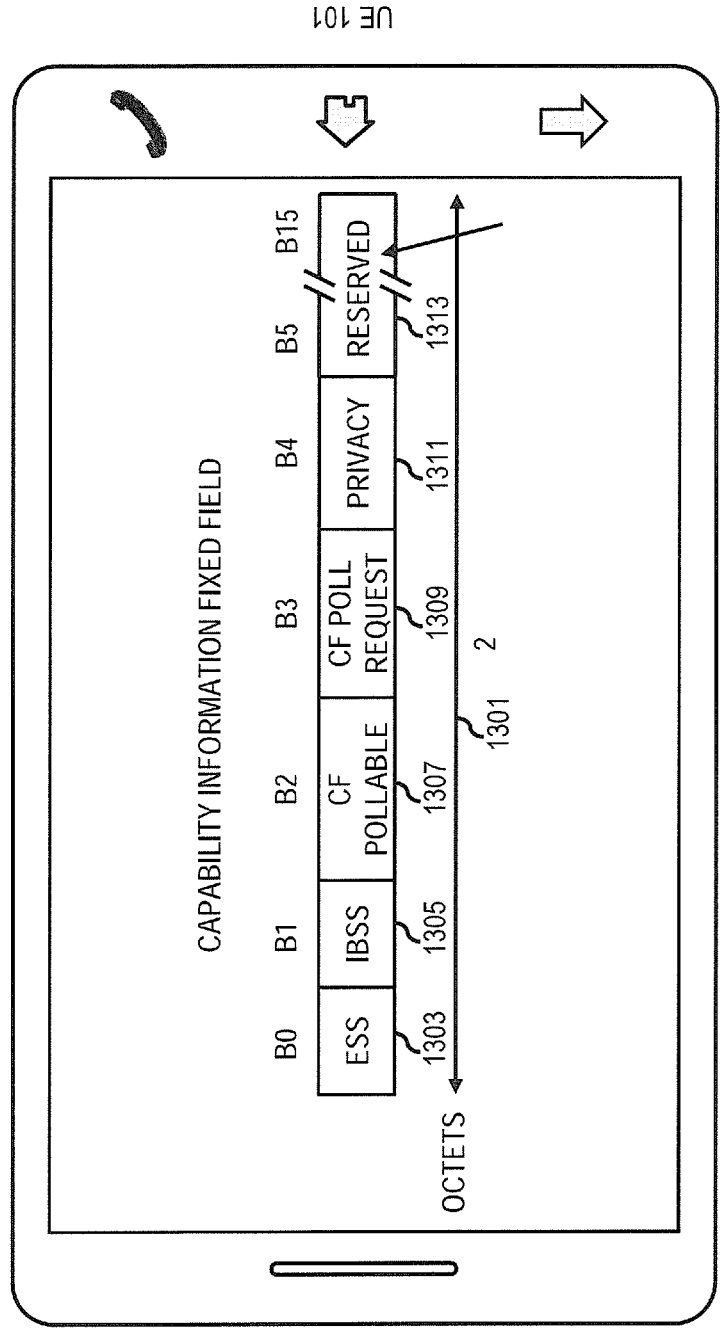

FIG. 13 is a diagram of a user interface utilized in the processes of FIGS. 3-6, according to various embodiments. FIG. 13 is a pictorial representation of capability information specified in the Beacon Frame Body detailed in FIG. 12. The capability information field contains a number of subfields that are used to indicate requested or advertised capabilities. The length of the capability information is 2 octets (1301). The capability information field consists of the following subfields: Extended Service Set (ESS) (1303), Independent Basic Service Set (IBSS) (1305), Contention free Pollable (CF-Pollable) (1307), CF-Poll request (1309), and Privacy (1311). The remaining part of the capability information field is reserved (1313).

The processes described herein for causing, at least in part, a generation and/or transmission of token data between at least one first device and at least one second device associated with at least one scheduled meeting, wherein location information may be shared based, at least in part, on the token data between the at least one first device and the at least one second device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 14:
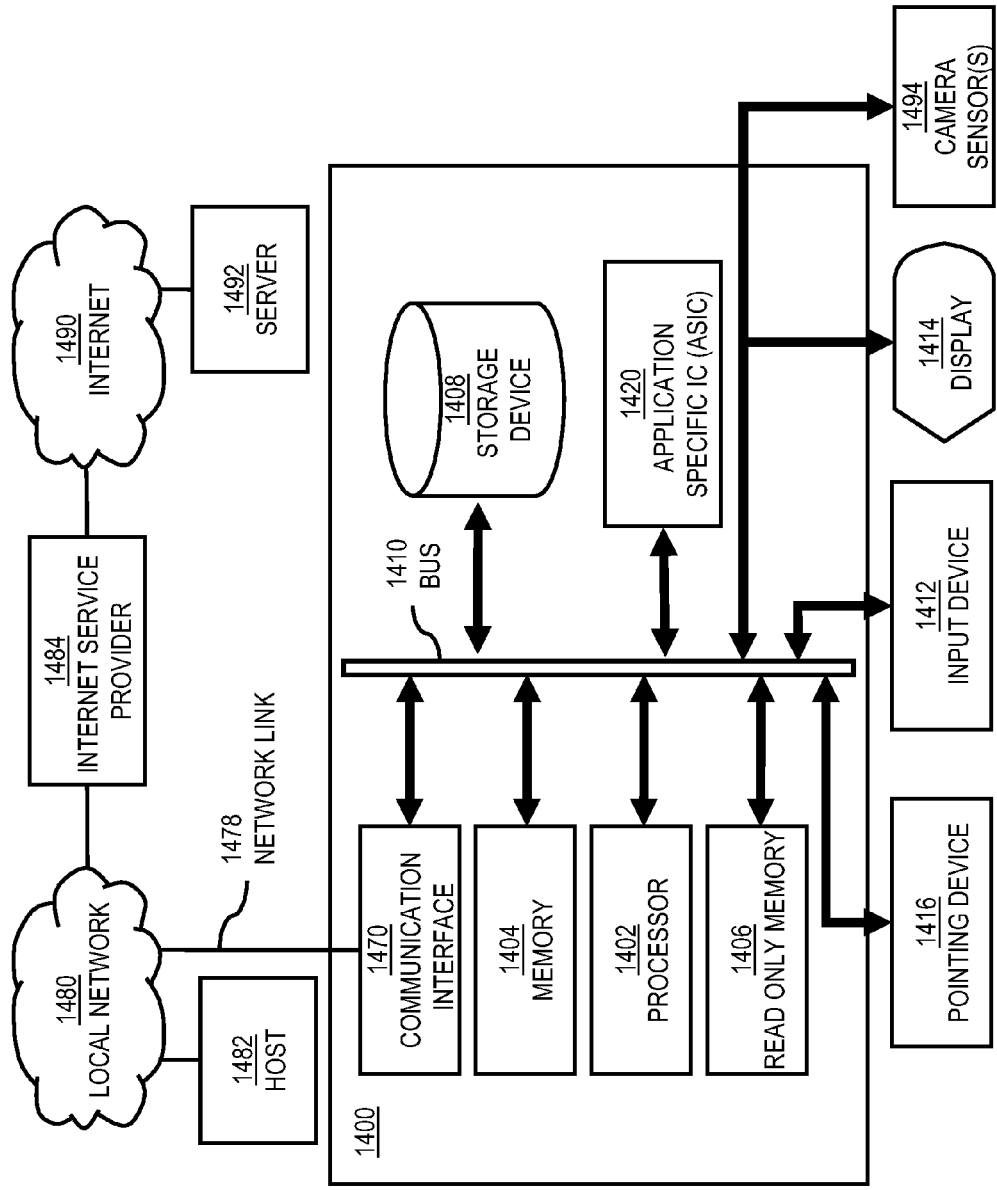
FIG. 14 is a diagram of hardware that can be used to implement an embodiment of the invention.

FIG. 14 illustrates a computer system 1400 upon which an embodiment of the invention may be implemented. Although computer system 1400 is depicted with respect to a particular device or equipment, it is contemplated that other devices or equipment (e.g., network elements, servers, etc.) within FIG. 14 can deploy the illustrated hardware and components of system 1400. Computer system 1400 is programmed (e.g., via computer program code or instructions) to cause, at least in part, a generation and/or transmission of token data between at least one first device and at least one second device associated with at least one scheduled meeting, wherein location information may be shared based, at least in part, on the token data between the at least one first device and the at least one second device as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of causing, at least in part, a generation and/or transmission of token data between at least one first device and at least one second device associated with at least one scheduled meeting, wherein location information may be shared based, at least in part, on the token data between the at least one first device and the at least one second device.

A bus 1410 includes one or more parallel conductors of information so that information is transferred quickly among devices coupled to the bus 1410. One or more processors 1402 for processing information are coupled with the bus 1410.

A processor (or multiple processors) 1402 performs a set of operations on information as specified by computer program code related to causing, at least in part, a generation and/or transmission of token data between at least one first device and at least one second device associated with at least one scheduled meeting, wherein location information may be shared, at least in part, on the token data between the at least one first device and the at least one second device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1400 also includes a memory 1404 coupled to bus 1410. The memory 1404, such as a random access memory (RAM) or any other dynamic storage device, stores information including processor instructions for causing, at least in part, a generation and/or transmission of token data between at least one first device and at least one second device associated with at least one scheduled meeting, wherein location information may be shared based, at least in part, on the token data between the at least one first device and the at least one second device. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or any other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for causing, at least in part, a generation and/or transmission of token data between at least one first device and at least one second device associated with at least one scheduled meeting, wherein location information may be shared based, at least in part, on the token data between the at least one first device and the at least one second device, is provided to the bus 1410 for use by the processor from an external input device 1412, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT), a liquid crystal display (LCD), a light emitting diode (LED) display, an organic LED (OLED) display, a plasma screen, or a printer for presenting text or images, and a pointing device 1416, such as a mouse, a trackball, cursor direction keys, or a motion sensor, for controlling a position of a small cursor image presented on the display 1414 and issuing commands associated with graphical elements presented on the display 1414, and one or more camera sensors 1494 for capturing, recording and causing to store one or more still and/or moving images (e.g., videos, movies, etc.) which also may comprise audio recordings. In some embodiments, for example, in embodiments in which the computer system 1400 performs all functions automatically without human input, one or more of external input device 1412, display device 1414 and pointing device 1416 may be omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of ASICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 107 for causing, at least in part, a generation and/or transmission of token data between at least one first device and at least one second device associated with at least one scheduled meeting, wherein location information may be shared based, at least in part, on the token data between the at least one first device and the at least one second device to the UE 101.

The term "computer-readable medium" as used herein refers to any medium that participates in providing information to processor 1402, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1408. Volatile media include, for example, dynamic memory 1404. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1420.

Network link 1478 typically provides information communication using transmission media through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490.

A computer called a server host 1492 connected to the Internet hosts a process that provides a service in response to information received over the Internet. For example, server host 1492 hosts a process that provides information representing video data for presentation at display 1414. It is contemplated that the components of system 1400 can be deployed in various configurations within other computer systems, e.g., host 1482 and server 1492.

At least some embodiments of the invention are related to the use of computer system 1400 for implementing some or all of the techniques described herein. According to one embodiment of the invention, those techniques are performed by computer system 1400 in response to processor 1402 executing one or more sequences of one or more processor instructions contained in memory 1404. Such instructions, also called computer instructions, software and program code, may be read into memory 1404 from another computer-readable medium such as storage device 1408 or network link 1478. Execution of the sequences of instructions contained in memory 1404 causes processor 1402 to perform one or more of the method steps described herein. In alternative embodiments, hardware, such as ASIC 1420, may be used in place of or in combination with software to implement the invention. Thus, embodiments of the invention are not limited to any specific combination of hardware and software, unless otherwise explicitly stated herein.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server host 1492 transmits program code for a particular application, requested by a message sent from computer 1400, through Internet 1490, ISP equipment 1484, local network 1480 and communications interface 1470. The received code may be executed by processor 1402 as it is received, or may be stored in memory 1404 or in storage device 1408 or any other non-volatile storage for later execution, or both. In this manner, computer system 1400 may obtain application program code in the form of signals on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

FIG. 15 illustrates a chip set or chip 1500 upon which an embodiment of the invention may be implemented. Chip set 1500 is programmed to cause, at least in part, a generation and/or transmission of token data between at least one first device and at least one second device associated with at least one scheduled meeting, wherein location information may be shared based, at least in part, on the token data between the at least one first device and the at least one second device as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1500 can be implemented in a single chip. It is further contemplated that in certain embodiments the chip set or chip 1500 can be implemented as a single "system on a chip." It is further contemplated that in certain embodiments a separate ASIC would not be used, for example, and that all relevant functions as disclosed herein would be performed by a processor or processors. Chip set or chip 1500, or a portion thereof, constitutes a means for performing one or more steps of providing user interface navigation information associated with the availability of functions. Chip set or chip 1500, or a portion thereof, constitutes a means for performing one or more steps of causing, at least in part, a generation and/or transmission of token data between at least one first device and at least one second device associated with at least one scheduled meeting, wherein location information may be shared based, at least in part, on the token data between the at least one first device and the at least one second device.

In one embodiment, the chip set or chip 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1500 includes merely one or more processors and some software and/or firmware supporting and/or relating to and/or for the one or more processors.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to cause, at least in part, a generation and/or transmission of token data between at least one first device and at least one second device associated with at least one scheduled meeting, wherein location information may be shared based, at least in part, on the token data between the at least one first device and the at least one second device. The memory 1505 also stores the data associated with or generated by the execution of the inventive steps.

Figure 16:
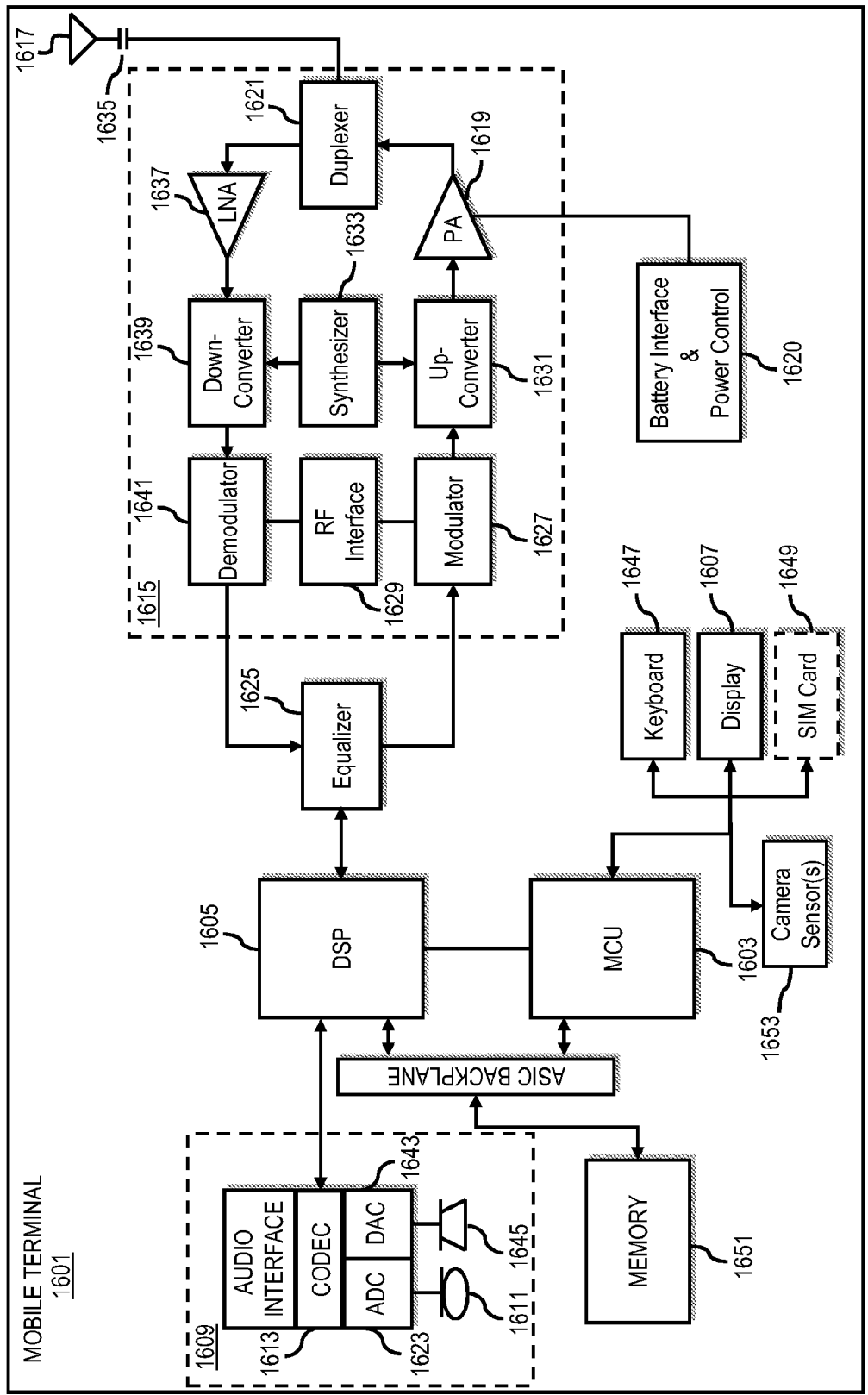
FIG. 16 is a diagram of a mobile terminal (e.g., handset) that can be used to implement an embodiment of the invention.

FIG. 16 is a diagram of exemplary components of a mobile terminal (e.g., handset) for communications, which is capable of operating in the system of FIG. 1, according to one embodiment. In some embodiments, mobile terminal 1601, or a portion thereof, constitutes a means for performing one or more steps of causing, at least in part, a generation and/or transmission of token data between at least one first device and at least one second device associated with at least one scheduled meeting, wherein location information may be shared based, at least in part, on the token data between the at least one first device and the at least one second device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1603, a Digital Signal Processor (DSP) 1605, and a receiver/transmitter unit including a microphone gain control unit and a speaker gain control unit.

A main display unit 1607 provides a display to the user in support of various applications and mobile terminal functions that perform or support the steps of causing, at least in part, a generation and/or transmission of token data between at least one first device and at least one second device associated with at least one scheduled meeting, wherein location information may be shared based, at least in part, on the token data between the at least one first device and the at least one second device. The display 1607 includes display circuitry configured to display at least a portion of a user interface of the mobile terminal (e.g., mobile telephone). Additionally, the display 1607 and display circuitry are configured to facilitate user control of at least some functions of the mobile terminal. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile terminal 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603 which can be implemented as a Central Processing Unit (CPU).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile terminal 1601 to cause, at least in part, a generation and/or transmission of token data between at least one first device and at least one second device associated with at least one scheduled meeting, wherein location information may be shared based, at least in part, on the token data between the at least one first device and the at least one second device. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the terminal. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile terminal 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable storage medium known in the art. The memory device 1651 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1649 carries, for instance, important information, such as the cellular phone number, the carrier supplying service, subscription details, and security information. The SIM card 1649 serves primarily to identify the mobile terminal 1601 on a radio network. The card 1649 also contains a memory for storing a personal telephone number registry, text messages, and user specific mobile terminal settings.

Further, one or more camera sensors 1653 may be incorporated onto the mobile station 1601 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
 initiating, by an apparatus, a generation of token data associated with at least one scheduled meeting between at least one first user and at least one second user;
 initiating, by an apparatus, a transmission of the token data to at least one first device associated with the at least one first user and to at least one second device associated with the at least one second user;
 initiating, by the apparatus, a broadcasting of the token data over at least one custom field of a wireless protocol and an activation of a mechanism for detecting the token data, at the at least one first device, at the at least one second device, or a combination thereof; and
 initiating, by the apparatus, a sharing of location information between the at least one first device and the at least one second device based, at least in part, on a detection of the token data by the mechanism for detecting,
 wherein the apparatus is embedded in the at least one first device, the at least one second device, or a server.

2. A method of claim 1, further comprising:
 initiating a limitation of the sharing of the location information based, at least in part, on one or more contextual parameters of the at least one scheduled meeting.

3. A method of claim 1, further comprising:
 initiating a generation of routing information based, at least in part, on the location information,
 wherein the routing information provides guidance for locating the at least one first device, the at least one second device, or a combination thereof.

4. A method of claim 1, wherein the sharing of the location information is via a peer-to-peer exchange over a short-range wireless connection, a location sharing service, or a combination thereof.

5. A method of claim 1, wherein the token data is broadcast, detected, or a combination thereof via a short-range wireless communication mechanism.

6. A method of claim 5, wherein the broadcasting and the activation of the mechanism for detecting are based, at least in part, on a location proximity threshold value, a temporal proximity threshold value, or a combination thereof of the at least one first device, the at least one second device, or a combination thereof to at least one location, at least one time, at least one date, or a combination thereof associated with the at least one scheduled meeting.

7. A method of claim 5, further comprising:
 determining that the broadcasting of the token data is at the at least one first device; and
 initiating a transmission of at least one message from the at least one first device to the at least one second device, the at least one message including a request to activate the mechanism for detecting at the at least one second device.

8. A method of claim 5, wherein the token data includes a universally unique identifier of the at least one scheduled meeting, the at least one first device, the at least one second device, or a combination thereof.

9. A method of claim 1, wherein the token data is broadcast, detected, or a combination thereof via WiFi, Bluetooth, or a combination thereof.

10. A method of claim 1, wherein the token data is anonymized with respect to the at least one first user, the at least one first device, the at least one second user, the at least one second device, the at least one scheduled meeting, or a combination thereof.

11. An apparatus comprising:
 at least one processor; and at least one memory including computer program code for one or more programs,
 the at least one memory and the computer program code configured to, with the at least one processor, cause the apparatus to perform at least the following,
 initiate a generation of token data associated with at least one scheduled meeting between at least one first user and at least one second user;
 initiate a transmission of the token data to at least one first device associated with the at least one first user and to at least one second device associated with the at least one second user;
 initiate a broadcasting of the token data over at least one custom field of a wireless protocol and an activation of a mechanism for detecting the token data, at the at least one first device, at the at least one second device, or a combination thereof; and
 initiate a sharing of location information between the at least one first device and the at least one second device based, at least in part, on a detection of the token data by the mechanism for detecting,
 wherein the apparatus is embedded in the at least one first device, the at least one second device, or a server.

12. An apparatus of claim 11, wherein the apparatus is further caused to: initiate a limitation of the sharing of the location information based, at least in part, on one or more contextual parameters of the at least one scheduled meeting.

13. An apparatus of claim 11, wherein the apparatus is further caused to:
 initiate a generation of routing information based, at least in part, on the location information,
 wherein the routing information provides guidance for locating the at least one first device, the at least one second device, or a combination thereof.

14. An apparatus of claim 11, wherein the sharing of the location information is via a peer-to-peer exchange over a short-range wireless connection, a location sharing service, or a combination thereof.

15. An apparatus of claim 11, wherein the token data is broadcast, detected, or a combination thereof via a short-range wireless communication mechanism.

16. An apparatus of claim 15, wherein the broadcasting and the activation of the mechanism for detecting are based, at least in part, on a location proximity threshold value, a temporal proximity threshold value, or a combination thereof of the at least one first device, the at least one second device, or a combination thereof to at least one location, at least one time, at least one date, or a combination thereof associated with the at least one scheduled meeting.

17. An apparatus of claim 15, wherein the apparatus is further caused to:
 determine that the broadcasting of the token data is at the at least one first device; and initiate a transmission of at least one message from the at least one first device to the at least one second device, the at least one message including a request to activate the mechanism for detecting at the at least one second device.

18. An apparatus of claim 15, wherein the token data includes a universally unique identifier of the at least one scheduled meeting,
the at least one first device, the at least one second device, or a combination thereof.

19. An apparatus of claim 11, wherein the token data is broadcast, detected, or a combination thereof via WiFi, Bluetooth, or a combination thereof.

20. An apparatus of claim 11, wherein the token data is anonymized with respect to the at least one first user, the at least one first device, the at least one second user, the at least one second device, the at least one scheduled meeting, or a combination thereof.

* * * * *